March 20, 1956　　　D. L. WAUGH　　　2,739,090
CORD BELTS
Original Filed Nov. 12, 1946
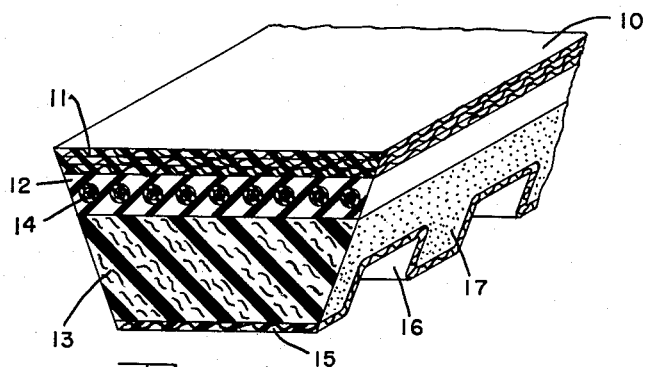
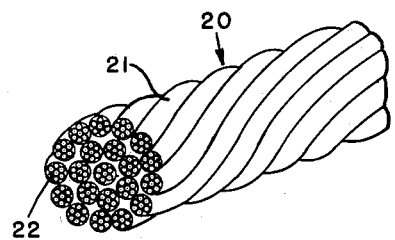
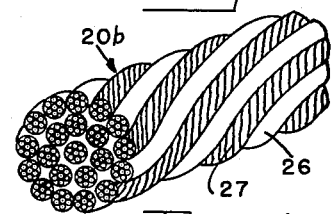
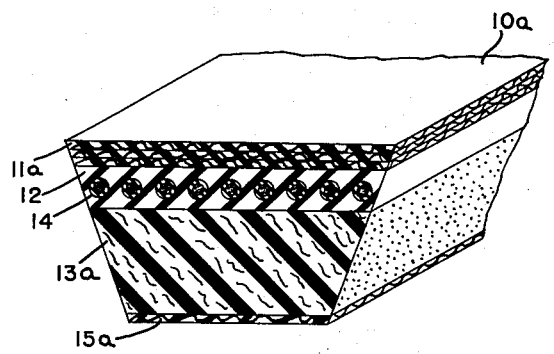
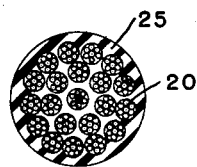
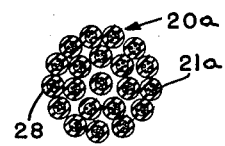
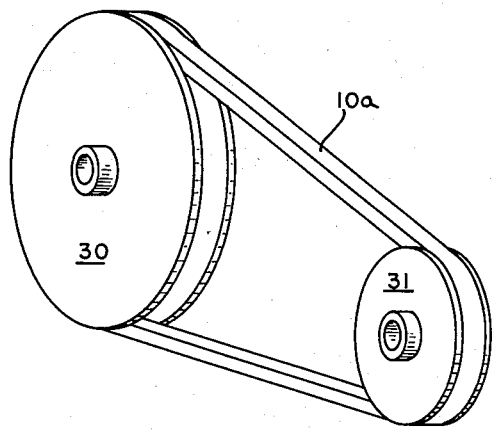
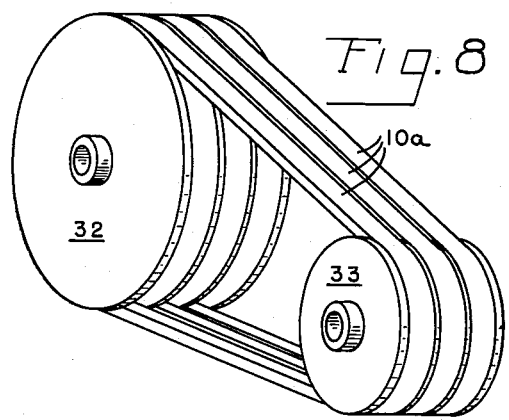
INVENTOR.
DALE L. WAUGH
BY
ATT'Y.

United States Patent Office 2,739,090
Patented Mar. 20, 1956

2,739,090
CORD BELTS

Dale L. Waugh, Dayton, Ohio, assignor to The Dayton Rubber Company, a corporation of Ohio Original application November 12, 1946, Serial No. 709,166, now Patent No. 2,631,463, dated March 17, 1953. Divided and this application November 12, 1952, Serial No. 320,054

3 Claims. (Cl. 154—52.2)

This invention relates to belts, and particularly to V-belts and the construction of the same. Belts have been constructed using reinforcing cords extending longitudinally along the belt for the purpose of strengthening the belt and avoiding elongation or stretching during the life of the belt. Many improvements have been directed to these reinforcing cords where they appear to have a direct bearing upon the active life of the belt. When using reinforcing cords in a belt it is essential that a satisfactory bond shall be established between the body of the belt and the reinforcing cords to avoid loose cords within the body of the belt.

In this invention, it is, therefore, an object of the invention to provide an improved reinforcing cord for a belt that may be satisfactorily bonded into the body of the belt.

It is also an object of the invention to provide a reinforcing cord for a belt that normally does not adhere will to the rubber body of the belt with a surface treatment such that it will be satisfactorily bonded into the body of the belt upon processing of the belt.

It is still another object of the invention to provide reinforcing cords for a belt that consists of glass fibers cabled or plied together to form a cord which may be placed in the body of the belt, and to provide a treatment, or a coating, for the glass fibers or the cord composed of the glass fibers which will cause a satisfactory bond to be obtained between the cord and the body of the belt.

It is still another object of the invention to provide a belt having reinforcing cords in it composed of a plurality of glass fibers, threads, or yarns cabled or plied together wherein one or more of the plies of the cord are composed of a cotton or a synthetic fiber, yarn, or cord of regenerated cellulose and/or cellulose derivative such as rayon yarn to increase the adhesion or bonding between the body of the belt and the cord.

Another object of the invention is to provide a belt having reinforcing cords in it that are composed of a plurality of threads consisting of individual glass fibers or filaments which are cabled or plied together into the cord composed of all threads or yarns of glass fibers or a mixture of glass fibers, threads, or yarns with cotton or rayon type threads or yarns, and wherein the plies or threads or the finished cord are coated with a synthetic organic compound selected from a group consisting of rubber and synthetic resins for providing for a satisfactory adhesion or bonding of the cord to the rubber body of the belt.

Further objects and advantages will become apparent from the drawings and the following description.

Figure 1 is a perspective cross-sectional view of a V cog belt incorporating features of this invention.

Figure 2 is a perspective cross-sectional view of a V flat bottom belt incorporating features of this invention.

Figure 3 is a perspective cross-sectional view of a reinforcing cord constructed of glass fibers or filaments.

Figure 4 is a perspective cross-sectional view illustrating reinforcing cord consisting partly of threads composed of glass fibers or filaments and partly of rayon-like or cotton threads.

Figure 5 is a cross-sectional view illustrating a reinforcing cord of the type shown in either Figures 3 or 4 wherein each of the individual threads or yarns has been coated with a material to increase adhesion between the cord and the rubber in the body of the belt.

Figure 6 is a cross-sectional view of a cord of the type illustrated in either Figures 3 or 4 wherein the finished cord is coated with a material to improve the adhesion or bond between the cord and the rubber in the body of the belt.

Figure 7 is a perspective elevational view with the application of a V-belt constructed in accordance with this invention to a single pulley drive system, while Figure 8 illustrates the application of a V-belt to a multiple pulley drive system.

The belt 10 illustrated in Figure 1 is a V-type cog belt that is composed of a tension section 11, a neutral axis section 12 and a compression section 13.

The tension section 11 is composed of a plurality of layers of rubberized fabric bonded together to compose the tension section.

The neutral axis section 12 is composed of a body of soft rubber forming a resilient cushion between the tension section 11 and the compression section 13. In the neutral axis section 12 there is provided a plurality of reinforcing cords 14 that extend longitudinally along the belt and are contained within the resilient rubber body of the neutral axis section 12.

The compression section 13 of the belt 10 is composed of a body of rubber in which fine fibers are dispersed substantially uniformly throughout the body thereof to give strength to the compression section 13. Those skilled in the art will understand that the rubber composition reinforced with the fine textile fibers which are arranged to lie substantially parallel to each other is commonly known by the trade name "Stiflex." However, it will be understood that in place of the "Stiflex" rubber composition a solid rubber can be used in the compression section 13 of the belt. A layer of rubberized fabric 15 may be placed along the bottom surface of the compression section for reinforcement.

In the belt illustrated in Figure 1 the compression section 13 is provided with regularly formed recesses 16 to thereby form cog teeth 17 in the lower surface of the belt.

In Figure 2 the belt 10a illustrated therein has the same general cross section as the belt 10 illustrated in Figure 1, but the cog teeth are omitted from the compression section 13a.

In this invention the reinforcing cords 14 that extend longitudinally through the body of the belt, and are positioned in the neutral axis section 12 are constructed of a plurality of threads or yarns or plies of glass fibers or filaments. In Figure 3 the reinforcing cord 20 consists of a plurality of individual threads or yarns or plies 21. Each of the threads 21 is composed of a plurality of individual glass fibers or filaments 22. These threads or yarns 21 or plies, are cabled or plied together to form the cord 20. As for example the yarns or threads 21 used to form the cord used in this invention each contains about 204 glass fibers or filaments grouped together. The yarn is known to the trade as 450 yarn, that is, 4500 yards per pound.

When producing the cord for use in this invention the twist in the individual plies or threads 21 is maintained as low as possible, and this is also true of the twist retained in the finished cord 20. This is to provide for a cord with the glass fibers or filaments lying in as near a straight line as possible and thereby avoid undue abrasion between the glass filaments. Also, the low twist applied in the cord reduces to a minimum the stretch or elongation of the cord, the continuous filaments of the cord being especially adaptable for producing cords having a low degree of twist.

The adhesion or bonding of a reinforcing cord composed of glass fibers or filaments within the rubber body of a belt cannot satisfactorily be obtained without some treatment of the surface of the threads or the cord.

To maintain the friction between the glass filaments or threads in the finished cord as low as possible, the threads or plies 21 are treated with an anti-abrasion agent before they are twisted into the form of the cord 20, or the finished cord may receive the anti-abrasion agent.

To increase the adhesion or bonding between the rubber in the neutral axis section 12 of the belt 10 and the surface of the cord 20, the cord may be treated with a homogeneous mixture of a liquid vehicle containing an organic compound selected from the group consisting of rubber and synthetic resins. With a surface coating of this type applied to the cord, a satisfactory bond is obtained between the cord and the rubber of the neutral axis section 12 of the belt.

In Figure 6 the reinforcing cord 20 is illustrated as having an exterior surface coating 25 of the type just referred to.

The mixture may be either an emulsion or a solution, and the vehicle may be either aqueous or organic. While rubber is referred to as being contained in the mixture, it is understood that either natural or synthetic rubbers, and synthetic resins or the like can be used in the homogeneous mixture.

It has been found that satisfactory results can be obtained by treating finished cord with a latex or a rubber cement, the resulting coating providing for a satisfactory adhesion between the cord 20 and the rubber of the neutral axis section 12.

Also, it has been found that if the fibers of the cellulose type that are used as reinforcements of the cord are treated with resorcinol formaldehyde latex that satisfactory adhesion is obtained between the cord and the rubber.

It has also been found that in place of treating the finished cord 20 that each of the threads or yarns or plies 21 can be individually treated as previously mentioned to provide a surface coating on each of the plies or threads. In Figure 5 there is illustrated a cord 20a in which each of the individual threads or plies 21a have been treated to provide a surface coating 28 of the type or types hereinbefore referred to.

While glass fibers, or filaments do not satisfactorily bond to rubber, the reinforcing cord may be satisfactorily bonded to a body of rubber by substituting cotton fibers or synthetic fibers, yarn, or cord of regenerated cellulose and/or cellulose derivative such as rayon for one or more of the threads or plies of the reinforcing cord. In Figure 4 there is illustrated a reinforcing cord 20b that is composed of a plurality of threads or plies some of which are composed of glass fibers and others of which are composed of cotton or rayon. The glass threads or yarns or plies 26 and the cotton or rayon threads or fibers or plies 27 are intermingled and twisted into the finished cord 20. The cotton or rayon threads 27 provide a sufficient surface for satisfactory adhesion of the rubber to the reinforcing cord 20b.

The cord 20b illustrated in Figure 4 may have the individual threads 26 and 27 coated as illustrated in Figure 5, or the finished cord 20b may be treated with a surface coating in the manner illustrated in Figure 6.

Figure 7 illustrates the use of a belt 10a in a single pulley drive system comprising the pulleys 30 and 31, while in Figure 8 the belts 10a are applied to a multiple pulley drive system consisting of the pulleys 32 and 33.

While a preferred construction of belt has been illustrated herein, and the invention described in connection therewith, yet it will be understood that the reinforcing cords can be used in a flat belt as well as in a V-belt, and that the belt may be constructed of all rubber instead of the fiberized rubber and fabric sections disclosed herein. However, the resilient rubber cushion, of which the neutral axis section 12 is composed, provides a satisfactory section giving resilience between the somewhat more rigid tension section 11 and the compression section 13. Also, as a further modification it is considered that the cords can be sandwiched between layers of a suitable rubber to obtain the desired coating of the cords and adhesion to the body of the belt.

While the specific form of the device disclosed and described herein constitutes a preferred form of the invention, yet it will be understood that the device is capable of alteration without departing from the spirit of the invention, and that all modifications that fall within the scope of the appended claims are intended to be included herein.

This application is a division of application Serial No. 709,166, filed November 12, 1946, for Cord Belts, now Patent No. 2,631,463, issued March 17, 1953.

I claim:

1. As a new article of manufacture a V-type rubber belt having a compression section, a neutral axis section comprising parallel longitudinally extending cords embedded in rubber, and a tension section comprising a plurality of rubberized fabric layers bonded together, said longitudinally extending cords being composed of a plurality of threads or plies of glass fibers intermingled and twisted together with a plurality of other threads or plies composed of cotton fibers all of said threads or plies lying generally longitudinally of the belt.

2. A V-type rubber belt according to claim 1 wherein the cotton fibers are coated with a bonding agent for rubber.

3. A V-type rubber belt according to claim 2 wherein the bonding agent for rubber is a mixture of resorcinol, formaldehyde and latex.

References Cited in the file of this patent

UNITED STATES PATENTS

| Number | Name | Date |
| --- | --- | --- |
| 2,113,561 | Freedlander | Apr. 12, 1938 |
| 2,133,237 | Slayter | Oct. 11, 1938 |
| 2,331,323 | Jahant | Oct. 12, 1943 |
| 2,411,027 | Crosley | Nov. 12, 1946 |
| 2,429,397 | Compton | Oct. 21, 1947 |
| 2,432,427 | Kuhn | Dec. 9, 1947 |
| 2,631,463 | Waugh | Mar. 17, 1953 |